(12) United States Patent
Byrum

(10) Patent No.: US 10,869,460 B2
(45) Date of Patent: Dec. 22, 2020

(54) ELECTRIFIED FEEDER SPINNER PLATE ACTUATOR ASSEMBLY

(71) Applicant: Glenn Byrum, Deer Park, TX (US)

(72) Inventor: Glenn Byrum, Deer Park, TX (US)

(*) Notice: Subject to any disclaimer, the term of this patent is extended or adjusted under 35 U.S.C. 154(b) by 250 days.

(21) Appl. No.: 15/896,878

(22) Filed: Feb. 14, 2018

(65) Prior Publication Data

US 2019/0246599 A1    Aug. 15, 2019

(51) Int. Cl.
| A01K 5/02 | (2006.01) |
| A01M 29/24 | (2011.01) |
| A01M 31/00 | (2006.01) |
| A01K 5/01 | (2006.01) |

(52) U.S. Cl.
CPC .............. *A01K 5/0225* (2013.01); *A01K 5/01* (2013.01); *A01K 5/0291* (2013.01); *A01M 29/24* (2013.01); *A01M 31/008* (2013.01)

(58) Field of Classification Search
CPC .... A01K 5/0225; A01K 5/0291; A01M 29/24
See application file for complete search history.

(56) References Cited

U.S. PATENT DOCUMENTS

| 5,191,857 A | * | 3/1993 | Boaz | A01K 39/0113 |
| | | | | 119/52.3 |
| 5,864,292 A | * | 1/1999 | Roestenberg | A01K 15/02 |
| | | | | 119/52.3 |
| 6,250,458 B1 | * | 6/2001 | Shibayama | B65G 17/086 |
| | | | | 198/851 |
| 7,866,579 B2 | * | 1/2011 | Chism | A01C 17/001 |
| | | | | 119/57.91 |
| 2005/0284385 A1 | * | 12/2005 | Quinn | A01K 5/0225 |
| | | | | 119/52.1 |
| 2008/0276875 A1 | * | 11/2008 | Zigan | A01K 39/0113 |
| | | | | 119/57.9 |
| 2010/0018467 A1 | * | 1/2010 | Massicotte | A01K 5/0275 |
| | | | | 119/57.7 |
| 2014/0261201 A1 | * | 9/2014 | Monk | A01K 5/0142 |
| | | | | 119/57.92 |
| 2017/0142929 A1 | * | 5/2017 | Poche | A01K 5/02 |
| 2018/0184617 A1 | * | 7/2018 | Kohler | A01K 5/0225 |

* cited by examiner

*Primary Examiner* — Michael H Wang
(74) *Attorney, Agent, or Firm* — Law Office of Jeff Williams PLLC; J. Oliver Williams

(57) ABSTRACT

An electrified feeder assembly includes a hopper, an actuator assembly, a motor, and at least one power supply. The hopper is configured to hold a quantity of feed wherein the feed is gravity fed downward through a feed tube. The actuator assembly is coupled to the hopper and is configured to selectively disperse feed when powered by the power supply. The motor receives power from the power supply and selectively spins the actuator assembly at a selected speed to open and close the feed tube. The speed of rotation induces a centrifugal force which opens the feed tube by translating the position of a portion of the actuator assembly. The feed exits the hopper through the feed tube and is dispersed through contact with the rotating actuator assembly. The actuator assembly is partially and temporarily electrified when manipulated in a closed position.

18 Claims, 6 Drawing Sheets

ELECTRIFIED FEEDER SPINNER PLATE ACTUATOR ASSEMBLY

BACKGROUND

1. Field of the Invention

The present application relates to a game, fish, and fowl feeder, and more particularly to an electrified spinner plate and an actuator that opens and closes to shut off feed flow.

2. Description of Related Art

Feeders are units used typically by hunters to bait or lure wild game to a particular location. They operate by storing a quantity of feed in a container and then locating spinner plate beneath the feed. At selected times, the feed is released onto the spinner. Spinner plates on feeders broadcast feed as they spin when the feed is released. However, spinner plates and feeders in general have many disadvantages. For example, spinner plates are notorious for their inability to prevent feed loss due to animal tampering, animals bumping the feeder, or wind. Some attempted solutions have tried spinner plate actuators that shut off feed flow, but fail to address the needs of the industry owning to their reliability and operational deficiencies. Additionally, spinner plate actuators do not prevent pest animals primarily raccoons and squirrels tampering with or damaging the feeder control unit.

Some advances with spinner plate actuators are herein described. Spinner plate actuators such as U.S. Pat. No. 5,820,635 move the spinner plate up and down to close against the funnel or feed tube of the container to shut off feed flow. It's operation relies upon the spinner plate weight, rotational inertia, rpm, and it's engagement on a corkscrew shaft to effect the lowering and elevating process.

Another type of opening and closing type of spinner/spinner actuator is described by Spreader U.S. Pat. No. 7,866,579 to Chism. This actuator lowers the spinner plate away from the feed tube when the motor is actuated opening gravity flow of feed onto the rotating spinner plate effecting the broadcasting of the feed. When motor activation ceases, the spinner plate elevates back to its position against the feed tube thus shutting off feed flow. Its operation relies upon centrifugal force acting on chain links that pull the upper sliding hub downward, thereby moving the spinner plate away from the feed tube and allowing feed to flow, and a spring to return the spinner plate in its up position.

A bird feeder with an electric shock deterrent to prevent squirrels from tampering with and stealing feed is described by Electronic Bird Feeder and Baffle U.S. Pat. No. 5,191,857 to Boaz. There is also a device that inflicts a shock on a pest animal tampering with a trash can as described by Animal Electric Shock Guard U.S. Pat. No. 5,864,292 to Roestenberg. High voltage as a deterrent to feed loss and tampering is seen with the Portable Deer Feeder of US Pat. Application 2005/0284385 to Quinn.

A Species Specific Feeder is found with US Pat. Application No. 2014/0261201 to Lewis & Monk that uses an electric fence transformer to non-lethally electrocute pest animals tampering or stealing feed. The device uses sound recognition electronics to control the high voltage circuit for the species specific feeder.

Many methods are known for stopping the loss of feed, similarly preventing tampering and damage to equipment. Most have consequences that can be expensive, unreliable, or have limited success. Spinner actuators described above are heavy, require large motors, consume a lot of energy, and in turn require large batteries. These actuators have open tops that expose the mechanism to dirt or dust intrusion that can cause malfunction. Construction design and materials can lend the devices to malfunction due to corrosion from outside weather exposure. High voltage as a pest deterrent is common among many fields. However, implementing high voltage on a feeder is a challenge due to cost and power requirements with units that are already consuming large amounts of energy. Energy usage is a big issue with conventional units.

Although strides have been made to provide a better feeder system, shortcomings remain. It is desired that an improved feeder assembly be provided to prevent feed loss due to animal tampering while consuming far less energy to operate.

SUMMARY OF THE INVENTION

It is an object of the present invention to provide a spinner actuator that corrects the design and construction deficiencies that prevent reliable operation.

It is another object of the present invention to provide a miniaturized spinner actuator that is compatible with the smaller less expensive 6 volt feeder control units.

It is another object of the present invention to provide a low-cost method to implement a high voltage pest deterrent on the feeder control unit.

It is another object of the present invention to provide a high voltage pest deterrent that is not prone to unreliability due to its battery power requirements. Use of this assembly avoids the need to use detailed and time-consuming methods.

Ultimately the invention may take many embodiments. This assembly overcomes the disadvantages inherent in the prior art.

The more important features of the assembly have thus been outlined in order that the more detailed description that follows may be better understood and to ensure that the present contribution to the art is appreciated. Additional features of the system will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the system in detail, it is to be understood that the assembly is not limited in its application to the details of construction and the arrangements of the components set forth in the following description or illustrated in the drawings. The assembly is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
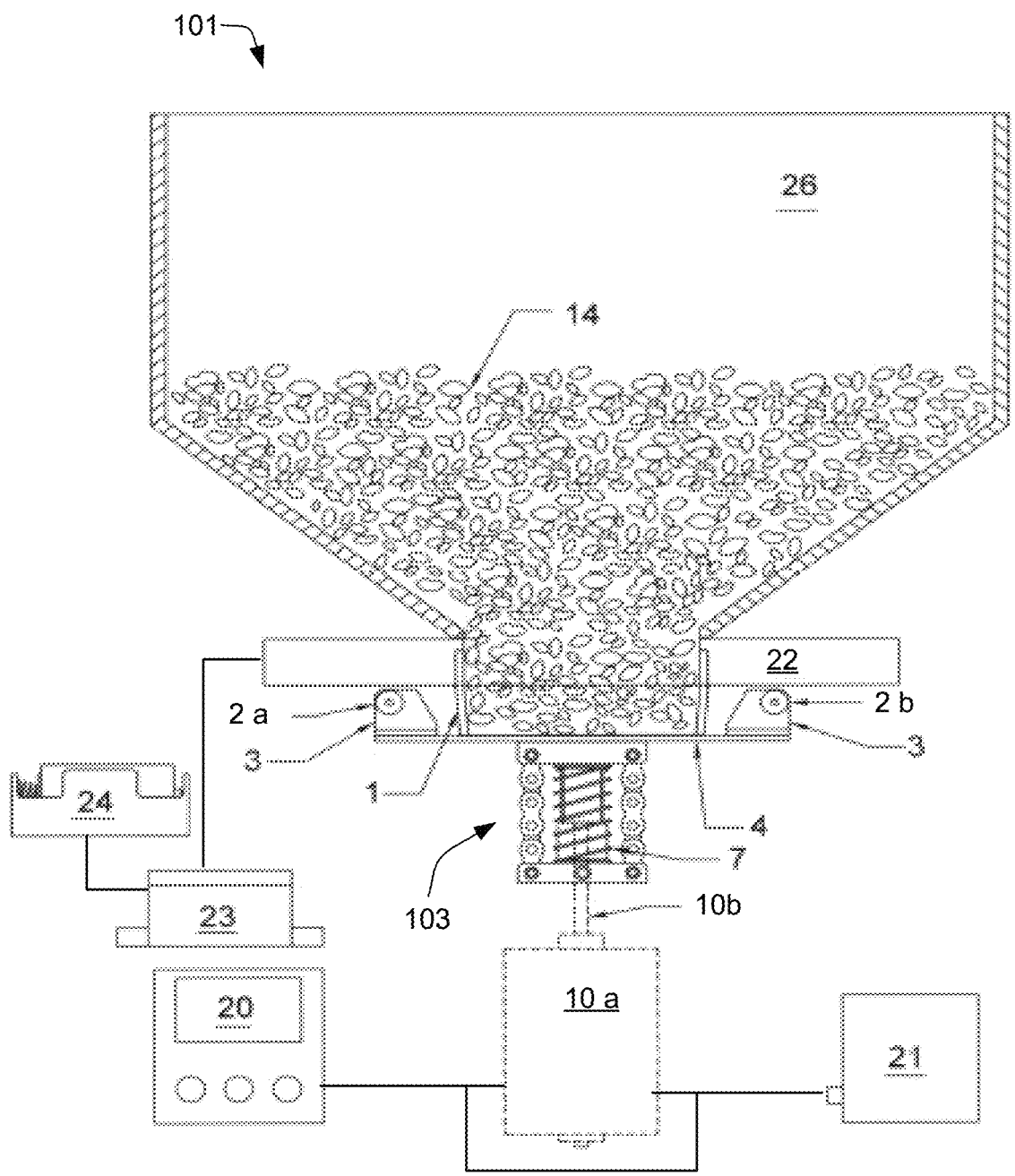
FIG. 1 is a side view of an electrified feeder spinner plate actuator assembly according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly and method in accordance with the present application overcomes one or more of the above-discussed problems commonly associated with conventional feed devices. In particular, the assembly of the present application is a spinner actuator that is reliable, and compatible with the smaller 6 volt power systems found on most feeder control units. Additionally, tampering is prevented by inflicting a non-lethal electrical shock to the animal that tampers with the spinner. This is done by electrifying the spinner itself. A novel aspect of the invention is the high voltage circuit. The circuit is always in an off position until an animal tampers with the spinner. When the animal tampers with the spinner, the high voltage becomes briefly energized, electrocutes the animal, and then turns itself off automatically. This feature eliminates the battery related reliability problems common to high voltage pest deterrents on feeder control units. These and other unique features of the assembly are discussed below and illustrated in the accompanying drawings.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The assembly includes a hopper, an actuator assembly, a motor, and at least one power supply. The hopper is configured to hold a quantity of feed wherein the feed is gravity fed downward through a feed tube. The actuator assembly is coupled to the hopper and is configured to selectively disperse feed when powered by the power supply. The motor receives power from the power supply and selectively spins the actuator assembly at a selected speed to open and close the feed tube. The speed of rotation induces a centrifugal force which opens the feed tube. The feed exits the hopper through the feed tube and is dispersed through contact with the rotating actuator assembly. The actuator assembly is partially and temporarily electrified when manipulated in a closed position. Additional features and functions of the device are illustrated and discussed below.

Referring now to the Figures wherein like reference characters identify corresponding or similar elements in form and function throughout the several views. The following Figures describe the assembly of the present application and its associated features. With reference now to the Figures, an embodiment of the assembly and method of use are herein described. It should be noted that the articles "a", "an", and "the", as used in this specification, include plural referents unless the content clearly dictates otherwise.

Figure 2:
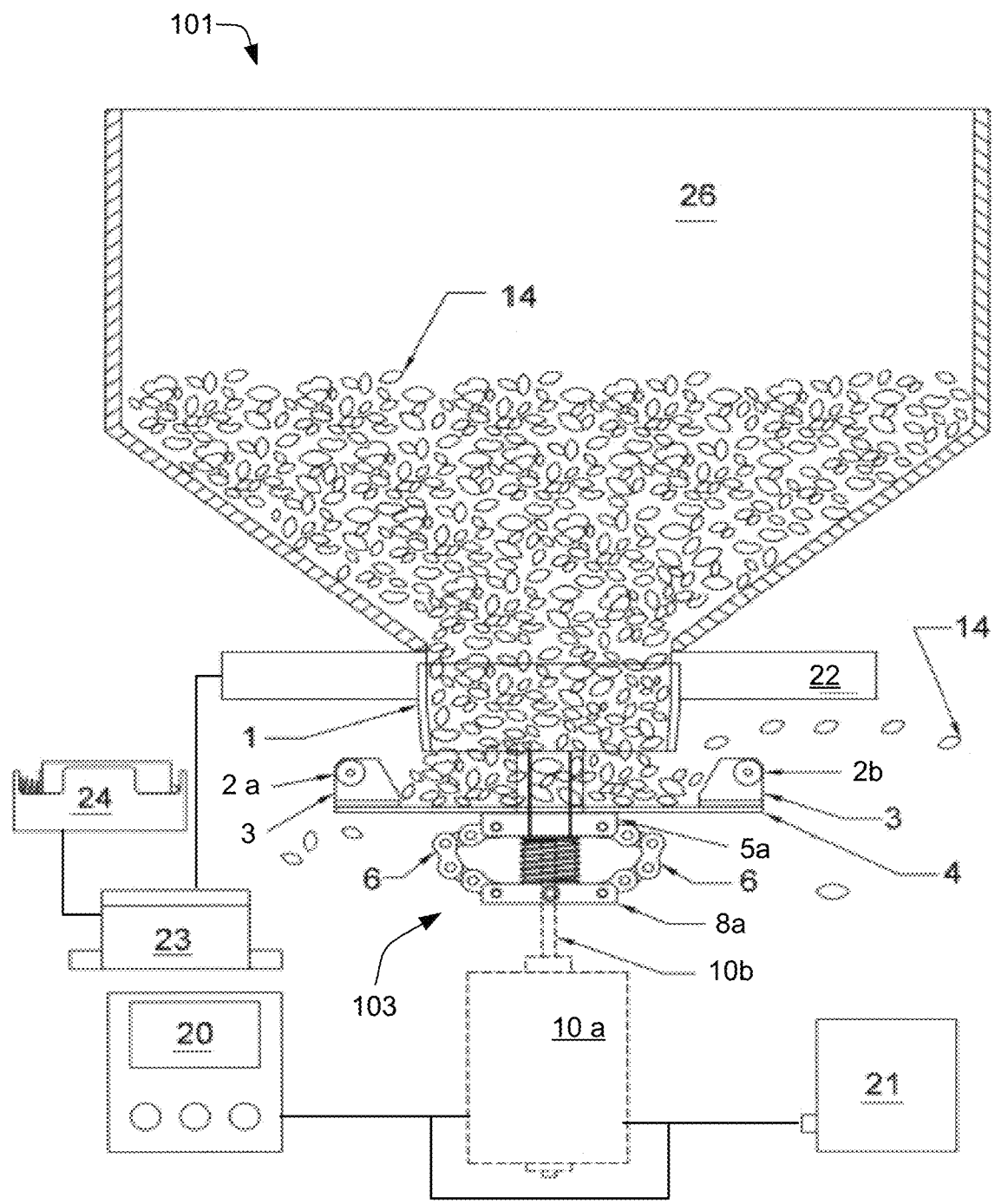
FIG. 2 is an alternate side view of the electrified feeder spinner plate actuator assembly of FIG. 1.

Referring now to FIGS. 1 and 2 in the drawings, side views of an electrified feeder spinner plate actuator assembly 101 is illustrated. Assembly 101 is configured to disperse feed 14 within an adjacent vicinity at selected times. Assembly 101 is configured to bait or feed any number of animals, such as wild animals, game, fowl, fish and so forth. Assembly 101 includes a hopper 26; an actuator assembly 103 composed of at least a spinner plate 4, an upper actuator hub 5a, a lower actuator hub 8a, and connection members 6 (i.e. chains, plates, pins, cables . . . ); a motor 10a; and a power supply 21. The actuator assembly 103 contacts the bottom of a feed tube 1 in communication with hopper 26. At selected times, the actuator assembly 103 is activated by motor 10a and detaches from feed tube 1 to permit the release of feed 14. Plate 4 is configured to spin and disperse the falling feed 14 radially. In FIG. 1, the actuator assembly 103 is shown in a closed position with plate 4 contacting feed tube 1. In FIG. 2, the actuator assembly 103 is activated and opened wherein plate 4 is detached from feed tube 1.

Figure 5A:
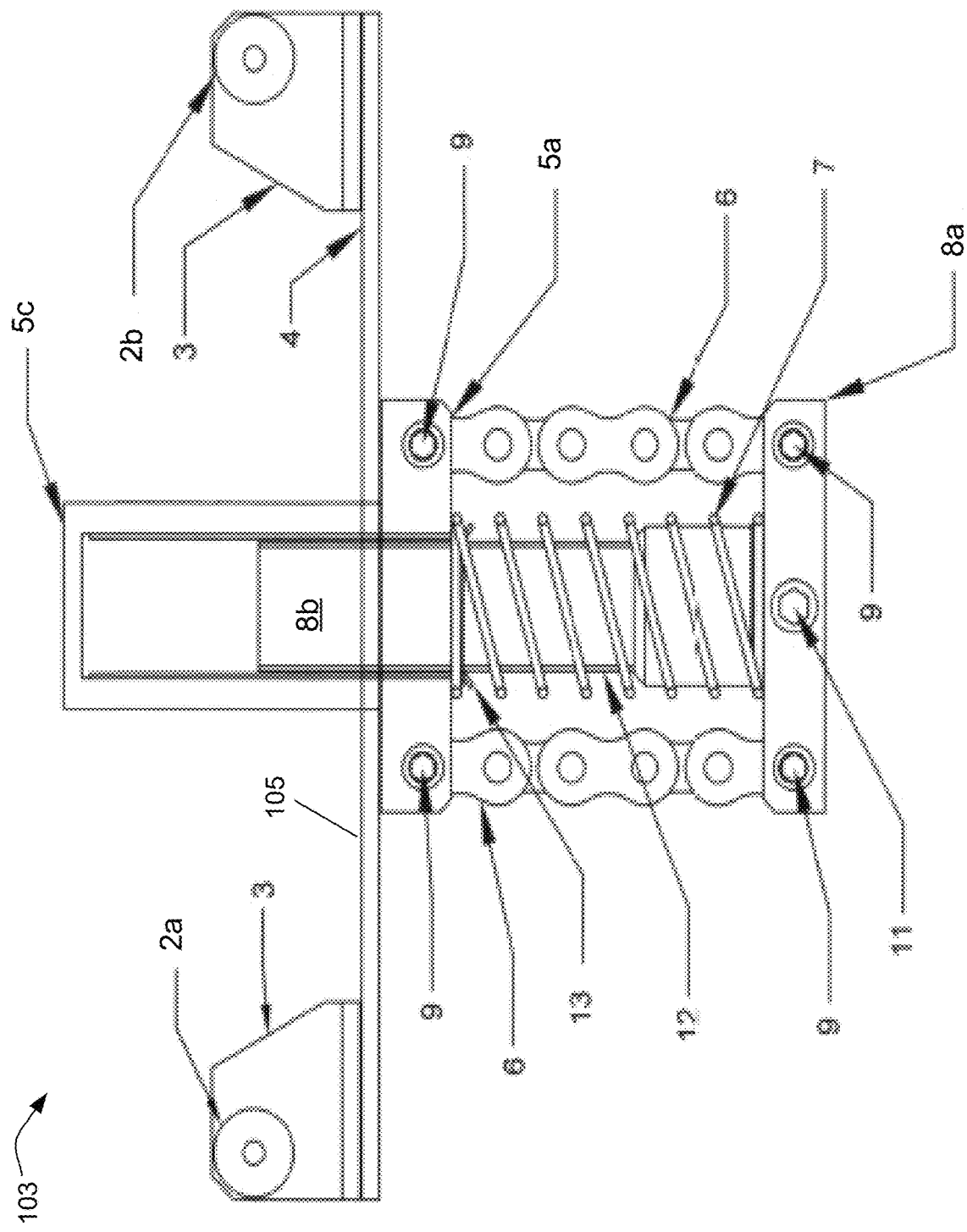
FIG. 5A is an enlarged side view of an actuator assembly in the electrified feeder spinner plate actuator assembly of FIG. 1.

Referring now also to FIG. 5A in the drawings, an enlarged side view of actuator assembly 103 is illustrated. Actuator assembly 103 disperses feed 14 when the timer 20 activates the motor 10a. In FIG. 5A, actuator assembly 103 is shown in a closed position. Assembly 101 includes timer 20 which is an electronic device used to selectively actuate motor 10a and also actuator assembly 103 at some preprogrammed or pre-set time durations. When closed, plate 4 is in contact with feed tube 1, preventing feed 14 from leaving hopper 26.

In operation, timer 20 concludes a time period and therefore initiates motor 10a. When initiated, motor 10a rotates the actuator assembly 103 which in turn causes plate 4 and upper actuator hub 5a to translate lower below feed tube 1. In operation, feed 14 gravity flows from the hopper 26 through the feed tube 1 in an open position. Feed 14 falls onto the rotating spinner plate 4 effecting feed dispersal. Spinner plate 4 includes paddles 3 which extend upward from an upper surface 105 of plate 4. The broadcasting of feed 14 is enhanced by paddles 3 located on the spinner plate 4. Paddles 3 are releasable coupled to plate 4 via one or more fasteners 15

Actuator assembly 103 further includes a biasing member 7 extending between the upper actuator hub 5a and the lower actuator hub 8a. Biasing member 7 presses the upper actuator hub 5a into a closed position against the feed tube 1 to prevent feed 14 from leaving the hopper 26 when motor 10a stops. Biasing member 7 automatically elevates the spinner plate 4 up and in contact with the feed tube 1. Timer 20 is configured to selectively shut off and turn on motor 10a as each set timing cycle runs its course. Timer 20 and motor 10a is powered by a power supply 21, such as a battery 21.

The lowering of plate 4 and upper actuator hub 5a is a result of centrifugal force acting upon connection members 6. Members 6 are non-rigid, meaning that they can flex and bend in the middle between ends. Additionally, the weight of members 6 are sufficient to have a centrifugal force that can overcome the spring force of biasing member 7. When rotated, members 6 pushes out radially which in turn pulls the upper actuator hub 5a and spinner plate 4 downward. When the rotation of actuator assembly 103 slows, the centrifugal forces diminish and the spring forces of biasing member 7 overcome the centrifugal forces of members 7 such that plate 4 raises to a closed position.

Figure 5B:
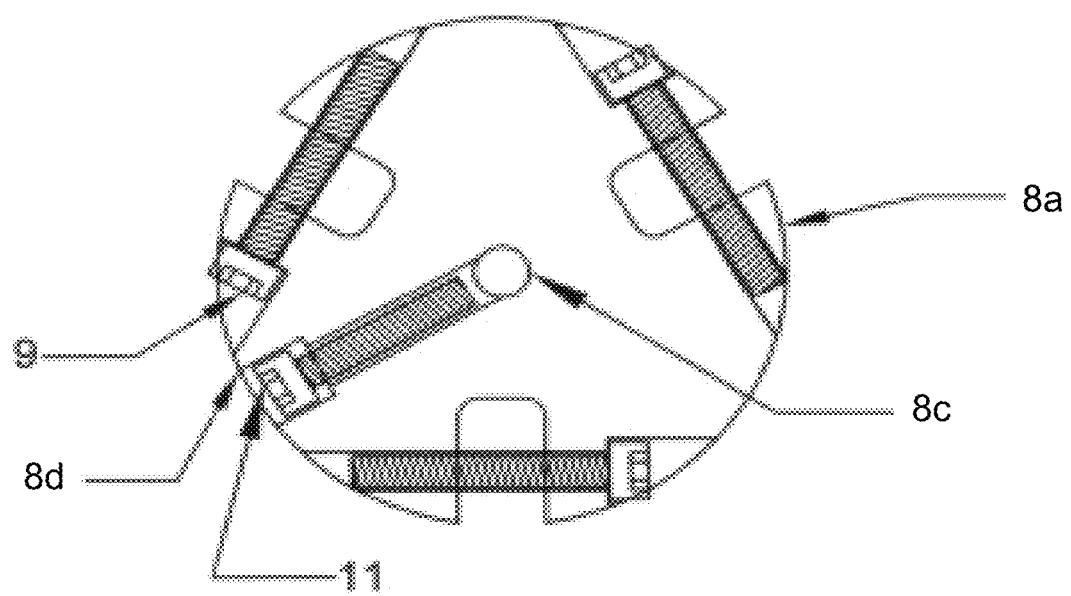
FIG. 5B is a bottom view of a lower actuator hub of the actuator assembly of FIG. 5A.
Figure 5C:
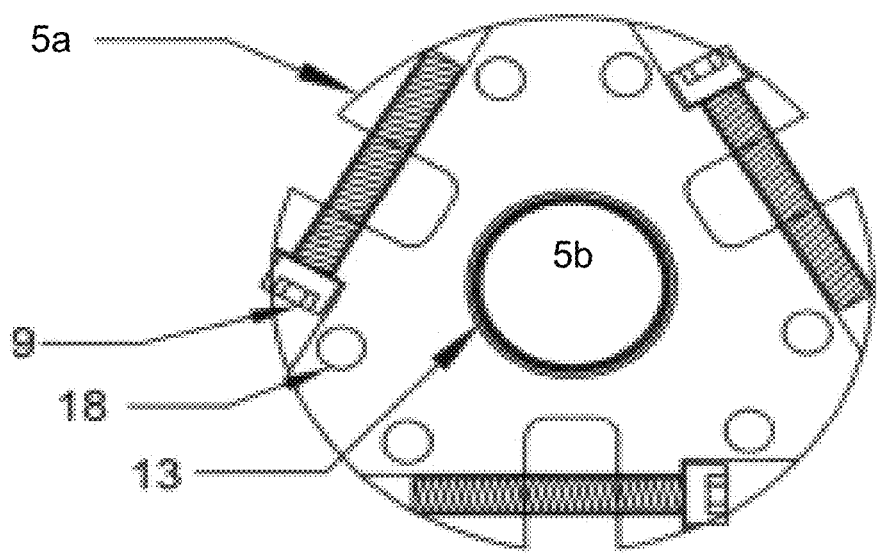
FIG. 5C is a bottom view of an upper actuator hub of the actuator assembly of FIG. 5A.

Referring now also to FIGS. 5B-5C in the drawings, bottom views of lower actuator hub 8a and upper actuator hub 5a are illustrated respectively. Lower actuator hub 8a has a center hole 8c for acceptance of motor shaft 10b that provides the mechanical coupling of the actuator assembly 103 to motor 10a. The lower actuator hub 8a has a threaded hole 8d that accommodates a set screw 11 that secures the lower actuator hub 8a onto the motor shaft 10b. It is important to point out that lower actuator hub 8a does not translate along motor shaft 10b before, after or during rotation of actuator assembly 103. Additionally, set screw 11 can be loosened to permit decoupling of lower actuator hub 8a from motor shaft 10b.

Spinner plate 4 is coupled to the upper actuator hub 5a by fasteners 18 (see FIG. 5C). Corresponding fasteners 18 are shown on views of plate 4 in FIGS. 3 and 4 discussed below. The lower actuator hub 8a includes a vertical shaft 8b extending vertically toward upper actuator hub 5a. Upper actuator hub 5a has an elevated neck 5c. Upper actuator hub 5a has a center hole 5b that allows vertical translation movement of neck 5c on the vertical shaft 8b of lower actuator hub 8a when transitioning between open and closed positions. This configuration prevents dirt or dust intrusion into the mechanism. Vertical shaft 8b includes a lining 12 to prevent the possibility of the mechanism jamming due to rust, oxidation, or galling. An example of lining 12 could be a brass lining. Biasing member 7 surrounds vertical shaft 8b.

The ends of the connection members 6 are attached to the upper actuator hub 5a and lower actuator hub 8a via fasteners 9. The upper actuator hub 5a has a lining 13 similar in form and function to lining 12 that prevents corrosion from jamming the mechanism. An example of lining 13 is a brass lining.

Figure 3:
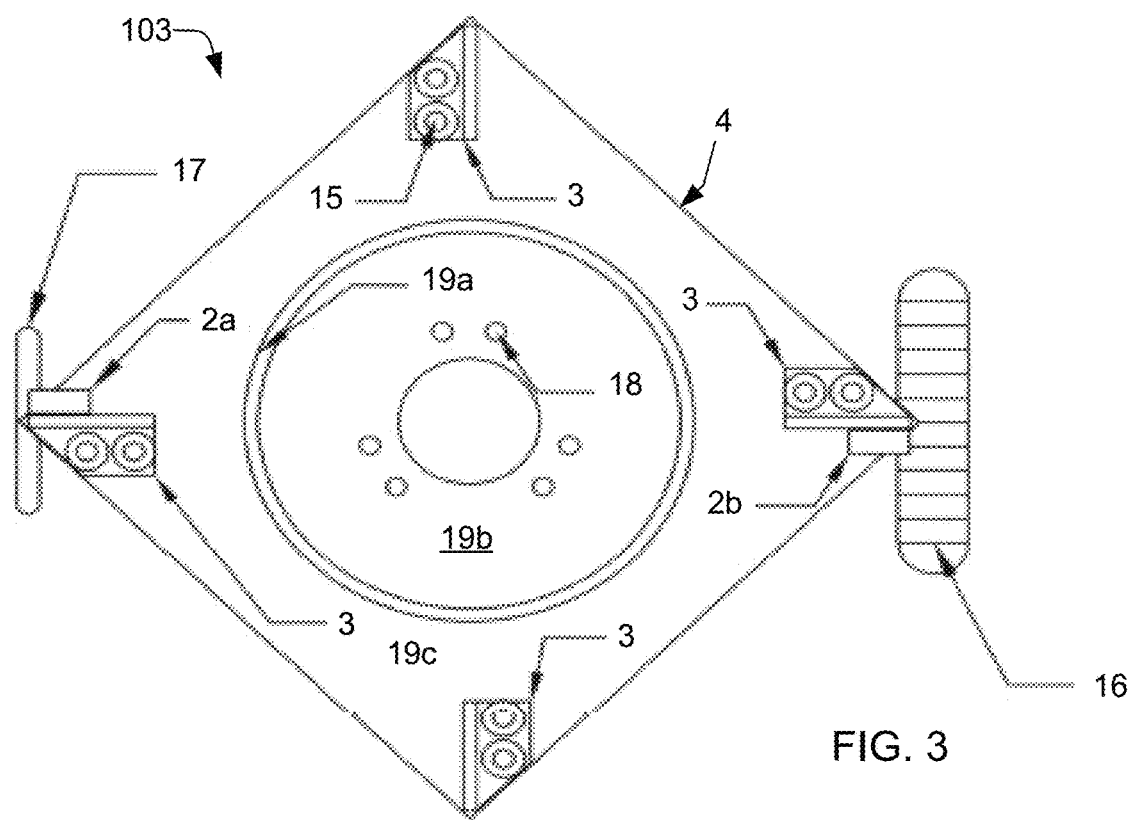
FIG. 3 is a top view of a spinner plate and actuator assembly in the electrified feeder spinner plate actuator assembly of FIG. 1.
Figure 4:
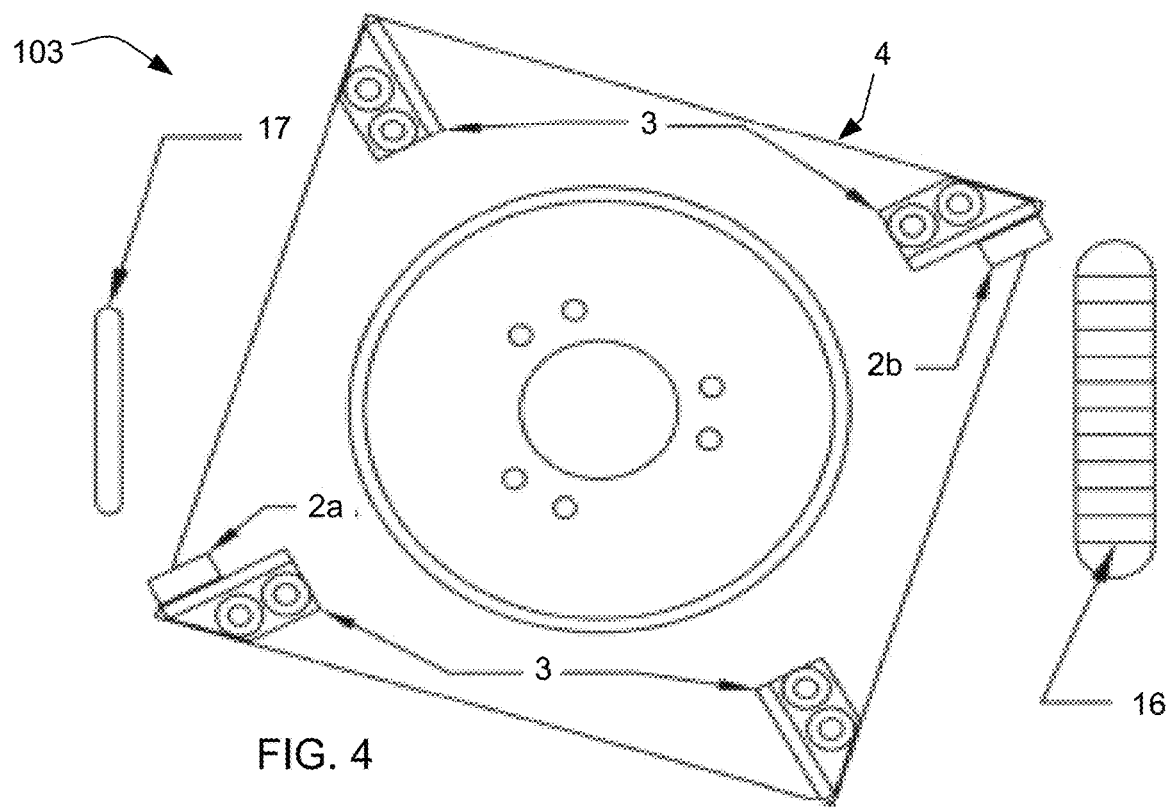
FIG. 4 is an alternate top view of the spinner plate and actuator assembly of FIG. 3.

Referring now also to FIGS. 3 and 4 in the drawings, top views of spinner plate 4 and actuator assembly 103 are illustrated. Animal tampering of actuator assembly 103 can lead to spillage of feed 14. Animal tampering is prevented by selectively electrifying spinner plate 4 when actuator assembly 103 is in a closed position. Assembly 101 further includes a secondary power supply, namely a high voltage transformer 23 and an insulator plate 22. Transformer 23 is in electrical communication with insulator plate 22 and is configured to provide high voltage to spinner plate 4 when plate 4 is tampered with.

Figure 6A:
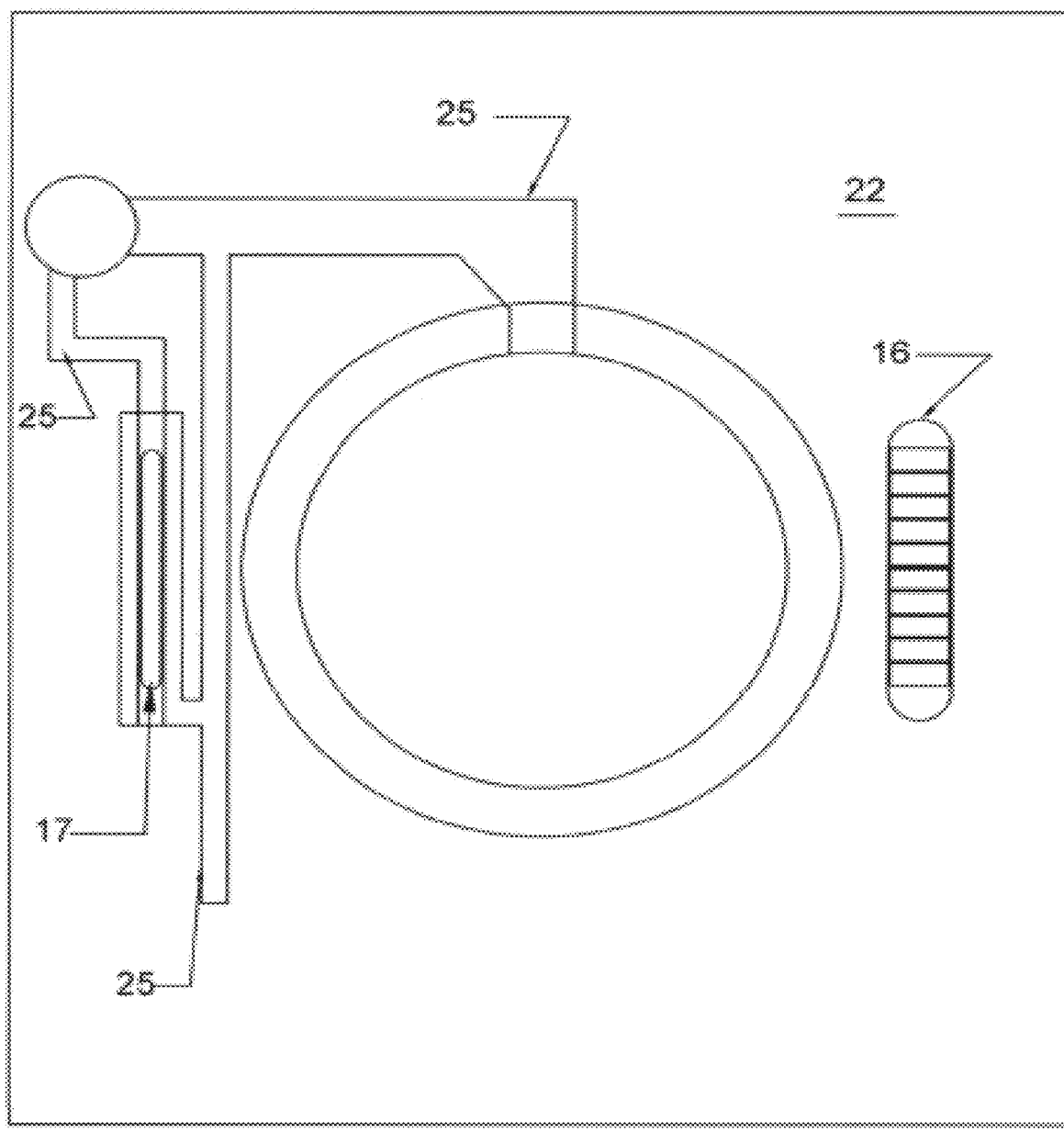
FIG. 6A is a top view of an insulator plate in the electrified feeder spinner plate actuator assembly of FIG. 1.
Figure 6B:
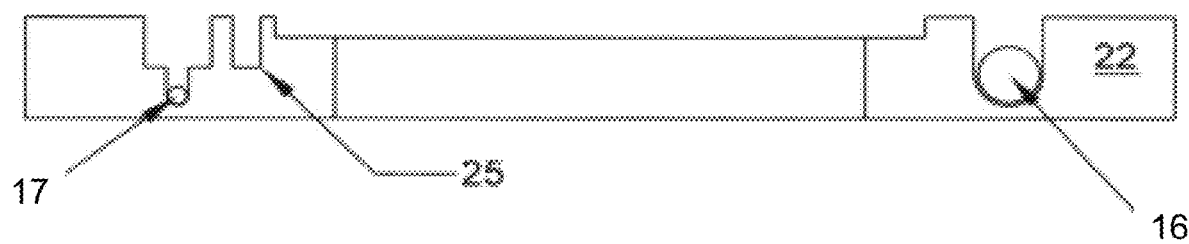
FIG. 6B is a side view of the insulator plate of FIG. 6A.

Referring now also to FIGS. 6A and 6B in the drawings, assorted views of insulator plate 22 is illustrated. Insulator plate 22 provides milled wire paths 25 for wiring and mounting locations for a magnetic switch 17 and a detent magnet 16. Magnetic switch 17 is wired to transformer 23 and acts as the gate for the passage of high voltage. High voltage is routed from the high voltage transformer 23, to the insulator plate 22, through the milled wire paths 25, and to the magnetic switch 17. Plate 4 has a tube contact area 19a for contacting of feed tube 1 when in a closed position.

Voltage is selectively passed through feed tube 1 to spinner plate 4 via contact area 19a. High voltage is selectively switched or activated when an animal rotates the spinner plate 4 when closed. As noted previously, spinner plate 4 has paddles 3 attached for broadcasting feed 14 during activation of motor 10a. Plate 4 also includes a one or more magnets configured to automatically adjust the rotational position of plate 4 and to selectively engage magnetic switch 17 to provide high voltage to plate 4. As seen in FIGS. 3 and 4, spinner magnet 2a and spinner magnet 2b are coupled to paddles 3. Paddles 3 provide mounting surfaces for the spinner magnets 2a and 2b, however, paddles 3 are not the only conceived method of locating magnets 2a and 2b.

As seen in FIG. 3, the rotational position of spinner plate 4 is such that magnet 2a is aligned with magnetic switch 17. At this time, high voltage passes to plate 4 through contact between switch 17 and magnet 2a. When plate 4 is rotated such that magnet 2a is away from switch 17, the high voltage ceases. In this manner plate 4 is selectively electrified and acts as an electrode. As plate 4 is only temporarily electrified as needed or when tampered with, the overall energy usage for the overall system is greatly minimized. When magnet 2a is aligned with switch 17, the opposite spinner magnet 2b is within the repelling force of the detent magnet 16. Detent magnet 16 is configured to have an opposing polarity to that of magnet 2b. To avoid the drain of electrical energy from the system and to prevent a continual electrification of plate 4, detent magnet 16 is configured to repel magnet 2b (see FIG. 4) so as to automatically adjust the rotational positioning of plate 4, such that magnet 2a is no longer aligned with switch 17. This turns off the high voltage and maintains an unelectrified position for plate 4.

The spinner plate 4 is configured to insulate the remaining portions of actuator assembly 103 from the high voltage. Upper actuator hub 5a is coupled to a lower surface of plate 4, opposite the surface of contact area 19a. The lower surface of plate 4 is devoid of electrically conductive metal or material in central area 19b. This provides an electrically insulated barrier between the high voltage and the upper actuator hub 5a. The high voltage is transferred from the feed tube 1 to the spinner plate 4 at the contact area 19a. The remainder of the spinner plate 4 surface 19c is electrically conductive and becomes the electrode that will electrically shock an animal if the animal tampers with the spinner plate 4.

It is understood that the high voltage transformer 23 is powered by one or more batteries 24. The secondary power supply is separate from that of the primary power supply 21 so as to not affect the operation of the electronic devices. A split electrical system has many advantages.

A summary of characteristics of assembly 101 include at least the following:

A spinner plate actuator that when the motor or motors are energized, the spinner plate lowers away from the feed tube allowing the feed to gravity flow from the hopper or container through the feed tube, and onto the rotating spinner plate resulting in feed dispersal. When the said motor or said motors are not energized, feed flow is blocked from flowing by the spinner plate automatically elevating within proximity of the feed tube to prevent feed flow as a result of a spring returning the said spinner plate upward to its maximum range of vertical travel on its slidable engagement on the lower actuator hub upper shaft.

The lower actuator hub has a hole to allow mechanically coupling to a motor output shaft, holes to affix plates and pins, a vertical shaft of such materials to prevent jamming, and a threaded hole for securing said lower actuator hub onto a motor shaft with a fastener.

An upper actuator hub with a central hole to accommodate the vertical shaft of the said lower actuator hub forming the slidable engagement between the lower and upper actuator hub, holes to affix plates and pins, a hollow protrusion that encompasses the upper portion of the lower actuator hub shaft, and a spinner plate.

Vertical movement of the spinner plate is effected by the upper actuator hub's connection to the lower actuator hub by a plurality of plates and pins that allow articulation movement of said plates and pins when centrifugal force is generated during motor activation. This results in pulling the upper actuator hub downward overcoming the force exerted by the biasing member.

A switching mechanism is included that turns the high voltage off or on, and a detent mechanism that forces the spinner plate and the attached actuator assembly to rotate to a position that switches the high voltage off.

A spinner plate may be composed of materials such as metallic, nonmetallic and composite materials; having multiple vertical surfaces attached to or integral to the spinner plate to facilitate broadcasting feed. The spinner plate may also include sensor activators to switch the high voltage on or off, and components that comprise the detent mechanism.

A high voltage power supply system includes a high voltage transformer, a battery or batteries that supply power to the said high voltage transformer, sensors that switch the high voltage on or off, electrodes to convey the high voltage, and insulators to isolate the high voltage.

The current application has many advantages over the prior art including at least the following:
(1) The Electrified Feeder assembly inflicts a non-lethal high voltage shock to an animal when it attempts to steal feed. The high voltage shock is a proven deterrent to prevent continued or future tampering;
(2) The Electrified Feeder assembly utilizes a cost effective and low current high voltage circuit that is energized only when the spinner is tampered with by an animal thus eliminating battery issues. Field testing of the circuitry has demonstrated over two years of service from two standard C cell alkaline flashlight batteries;
(3) The spinner actuator assembly automatically opens feed flow during timer/motor activation and automatically closes feed flow when motor activation ceases;
(4) The Electrified Feeder assembly utilizes a lightweight spinner actuator weighing approximately 2.5 ounces. The design and construction is also based on locating the mechanical components of the spinner actuator as close as possible to the central axis of motor rotation to further reduce the motor force required to rotate the spinner actuator. The spinner actuator is well suited for use on the typical ⅛" shaft feeder motors; and
(5) The Electrified Feeder assembly utilizes brass liners on the actuator movable upper actuator hub and the lower actuator hub shaft to provide trouble free reliable operation. The upper actuator hub encloses around the lower hub shaft to prevent dirt or dust intrusion into the mechanism.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:
1. An electrified feeder assembly, comprising:
a hopper configured to hold a quantity of feed, the feed configured to fall through a feed tube out of the hopper;
an actuator assembly coupled to the hopper and configured to selectively disperse feed;
a motor in communication with the actuator assembly, the motor configured to selectively spin the actuator assembly at a selected speed to open and close the feed tube, the speed of rotation induces a centrifugal force which opens the feed tube, the feed exiting the hopper through the feed tube, wherein the feed is dispersed through contact with the rotating actuator assembly;

an insulator plate coupled to the feed tube and in electrical communication with a high voltage transformer, the insulator plate includes a magnetic switch and a detent magnet; and a power supply in communication with the motor;

wherein the actuator assembly is temporarily electrified when manipulated in a closed position.

2. The assembly of claim 1, wherein the actuator includes:
an upper actuator hub and a lower actuator hub;
a connection member extending between the upper actuator hub and the lower actuator hub; and
a spinner plate coupled to the upper actuator hub.

3. The assembly of claim 2, wherein the actuator assembly further includes a biasing member extending between the upper actuator hub and the lower actuator hub, such that the biasing member presses the upper actuator member into a closed position against the feed tube to prevent feed from leaving the hopper.

4. The assembly of claim 2, wherein the lower actuator hub includes a vertical shaft extending partially between the upper actuator hub and the lower actuator hub.

5. The assembly of claim 4, wherein the upper actuator hub includes an elevated neck surrounding a portion of the vertical shaft, the elevated neck configured to translate along the vertical shaft.

6. The assembly of claim 5, wherein at least one of the upper actuator hub and the lower actuator hub includes a lining to prevent any of oxidation, rust and galling sufficient to hinder movement of the elevated neck about the vertical shaft.

7. The assembly of claim 1, wherein the actuator assembly includes a spinner plate having one or more paddles used to disperse the feed as it falls through the feed tube, the spinner place configured to contact the feed tube when not rotated.

8. The assembly of claim 7, wherein the spinner plate is selectively electrified when in contact with the feed tube.

9. The assembly of claim 7, wherein the spinner plate is electrified when rotated while in contact with the feed tube.

10. The assembly of claim 7, wherein the spinner plate automatically adjusts its rotational position about the feed tube to maintain an unelectrified position.

11. The assembly of claim 1, wherein the detent magnet is configured to automatically rotationally position the spinner plate into an unelectrified position.

12. The assembly of claim 1, wherein high voltage is selectively passed from the high voltage transformer through the feed tube and the magnetic switch to the spinner plate when the spinner plate is rotated while in contact with the feed tube.

13. The assembly of claim 12, wherein the spinner plate is configured to include a plurality of spinner magnets, the spinner magnets configured to generate a repelling force from the detent magnet to automatically induce a rotational position of the spinner plate relative to the insulator plate to ensure the spinner plate is unelectrified.

14. The assembly of claim 13, wherein the spinner plate is electrified when at least one of the spinner magnets aligns with the magnetic switch.

15. The assembly of claim 12, wherein the actuator further includes:
an upper actuator hub coupled to the spinner plate opposite the side of the feed tube, the upper actuator hub is insulated from the spinner plate, such that the electricity fails to transfer to the upper actuator hub.

16. The assembly of claim 15, wherein the area of contact on the spinner plate for contacting the upper actuator hub is devoid of conductive material so as to cease the transmission of electricity between them.

17. The assembly of claim 1, further comprising:
a timer in communication with the motor to selectively induce rotation of the actuator assembly.

18. The assembly of claim 1, further comprising:
a secondary power supply used to selectively electrify the actuator assembly, the secondary power supply being separate from the power supply to open the feed tube.

* * * * *